(12) United States Patent
Sassi

(10) Patent No.: US 10,313,663 B2
(45) Date of Patent: Jun. 4, 2019

(54) 3D VIEWING WITH BETTER PERFORMANCE IN BOTH LUMEN PER WATT AND BRIGHTNESS

(75) Inventor: Jari Sassi, Lund (SE)

(73) Assignee: SONY CORPORATION, Tokyo (JP)

( * ) Notice: Subject to any disclaimer, the term of this patent is extended or adjusted under 35 U.S.C. 154(b) by 1046 days.

(21) Appl. No.: 13/825,450

(22) PCT Filed: Apr. 12, 2012

(86) PCT No.: PCT/IB2012/051808
§ 371 (c)(1),
(2), (4) Date: Mar. 21, 2013

(87) PCT Pub. No.: WO2013/153418
PCT Pub. Date: Oct. 17, 2013

(65) Prior Publication Data
US 2013/0271581 A1    Oct. 17, 2013

(51) Int. Cl.
*H04N 13/293* (2018.01)
*H04N 13/315* (2018.01)
(Continued)

(52) U.S. Cl.
CPC ......... *H04N 13/315* (2018.05); *H04N 13/133* (2018.05); *H04N 13/161* (2018.05);
(Continued)

(58) Field of Classification Search
CPC .............................. H04N 13/00; H04N 13/293
(Continued)

(56) References Cited

U.S. PATENT DOCUMENTS 8,451,320 B1 * 5/2013 Cole ................... H04N 19/597
348/43
2002/0163574 A1   11/2002 Divelbiss et al.
(Continued)

FOREIGN PATENT DOCUMENTS

CN         101961555 A      2/2011
CN         102215364 A     10/2011
(Continued)

OTHER PUBLICATIONS

Ian, "Autostereoscopic Displays", 3D Forums, Discussion in 'Articles' started by Ian [online], [Retrieved on Mar. 13, 2013],Retrieved from Internet: http://www.3d-forums.com/threads/autostereoscopic-displays. 1/.

*Primary Examiner* — Jorge L Ortiz Criado
*Assistant Examiner* — Kyle M Lotfi
(74) *Attorney, Agent, or Firm* — Tucker Ellis LLP

(57) ABSTRACT

A method and apparatus for providing a three-dimensional display to a viewer is disclosed. If a color difference between pixels of a right eye image area and corresponding pixels of a left eye image area is greater than or equal to a predefined difference threshold, a parallax barrier is controlled to block either the right or the left eye image area from the viewer. Otherwise, if the color difference is less than the predefined threshold, the parallax barrier is controlled to display both the right and left eye image areas to the viewer. Corresponding devices to implement the method are also disclosed. The method may be performed by an autostereoscopic display controller, or a pair of active shutter glasses, for example.

15 Claims, 6 Drawing Sheets

(51) Int. Cl.
*H04N 13/161* (2018.01)
*H04N 13/286* (2018.01)
*H04N 13/133* (2018.01)

(52) U.S. Cl.
CPC ......... *H04N 13/286* (2018.05); *H04N 13/293* (2018.05); *H04N 2213/008* (2013.01)

(58) Field of Classification Search
USPC .................................. 348/43, 55, 57, 58, 59
See application file for complete search history.

(56) References Cited

U.S. PATENT DOCUMENTS

| | | |
|---|---|---|
| 2006/0139448 A1* | 6/2006 | Ha .................... H04N 19/597 348/51 |
| 2011/0018868 A1 | 1/2011 | Inoue et al. |
| 2011/0090304 A1* | 4/2011 | Song .................. H04N 21/4821 348/42 |
| 2011/0159929 A1 | 6/2011 | Karaoguz et al. |
| 2011/0164110 A1 | 7/2011 | Fortin et al. |
| 2011/0169919 A1 | 7/2011 | Karaoguz et al. |
| 2011/0199460 A1 | 8/2011 | Gallagher |

FOREIGN PATENT DOCUMENTS

| | | |
|---|---|---|
| EP | 0751690 A2 | 1/1997 |
| EP | 2346021 A1 | 7/2011 |

\* cited by examiner

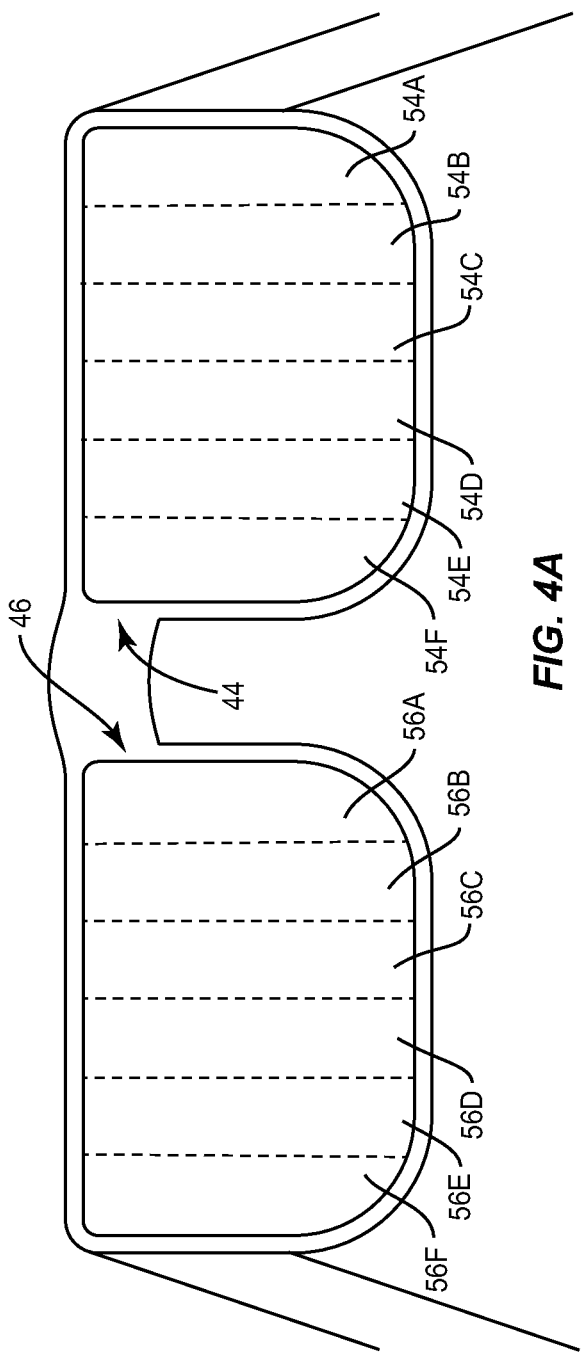
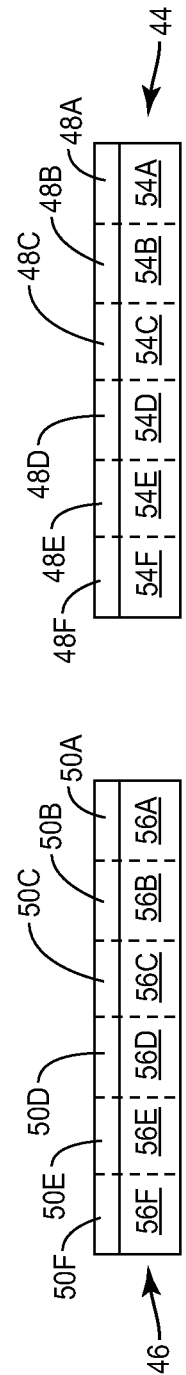
FIG. 4A
FIG. 4B

3D VIEWING WITH BETTER PERFORMANCE IN BOTH LUMEN PER WATT AND BRIGHTNESS

BACKGROUND

The present invention generally relates to three-dimensional (3D) displays, and more particularly relates to a method of providing a 3D display to a viewer.

Presentation of a 3D image to a viewer is achieved using a technique known as "stereoscopy," in which two offset images are separately displayed to the right and left eye of a viewer. When the viewer's brain combines those images, the user perceives the otherwise two-dimensional (2D) images as being 3D. With the recent rise in popularity of 3D films and video games, technological advances have been made in stereoscopy.

With recent 3D televisions, "active shutter" glasses have been used to achieve a 3D effect. Active shutter glasses include two lenses, each having a liquid crystal layer that can be controlled to be dark (and prevent image viewing) or be transparent (and facilitate image viewing). The glasses are synchronized with an electronic display (e.g. a television) to rapidly alternate which of the lenses if darkened at any given time, which achieves the desired effect of each eye seeing only the image intended for it.

"Autostereoscopy" refers to the display of stereoscopic images without the use of special headgear or glasses on the part of the viewer. A popular form of autostereoscopic display utilizes a parallax barrier that includes a plurality of spaced apart columns arranged to block a given eye from seeing an image portion meant for the opposite eye. This carefully arranged blocking enables two separate images to be displayed to the right and left eyes simultaneously.

However, only a portion of a video frame or image is typically displayed in 3D at any given time, with the remaining portion being presented in 2D. Thus, for the non-3D image areas, essentially the same image is being separately shown to a viewer's right and left eyes simultaneously.

SUMMARY

Embodiments of the present invention provide a parallax barrier for controlling what is seen by a viewer's right and left eyes from a 3D display. A color difference is determined between corresponding right and left eye images areas, and if the difference is beneath a predefined threshold, indicating that there is little or no difference between the corresponding image areas, then the parallax barrier may display both of those areas to the viewer simultaneously.

According to one embodiment, a method of providing a three-dimensional display to a viewer is disclosed. If a color difference between pixels of a right eye image area and corresponding pixels of a left eye image area is greater than or equal to a predefined difference threshold, a parallax barrier is controlled to block either the right or the left eye image area from the viewer. Otherwise, if the color difference is less than the predefined threshold, the parallax barrier is controlled to display both the right and left eye image areas to the viewer. The method may be performed by an autostereoscopic display, or a pair of active shutter glasses, for example.

An exemplary autostereoscopic electronic display operable to perform the method includes a display layer upon which an image is projected, with the image including a plurality of adjacent sets of right and left eye image areas. A parallax barrier is situated between the display layer and a viewer. The parallax barrier includes a plurality of separate parallax barrier areas each corresponding to one of the adjacent sets of right and left image areas. A controller is configured to control each parallax barrier area. The controller controls each parallax barrier area to block either its corresponding right or left eye image area from the viewer responsive to a color difference between pixels of the right eye image area and corresponding pixels of the left eye image area being greater than or equal to a predefined difference threshold. The controller controls each parallax barrier to display both of its corresponding right and left eye image areas to the viewer responsive to the color difference being less than the predefined threshold.

Exemplary active shutter glasses operable to perform the method are synchronized with an electronic display to provide a three-dimensional view of the electronic display to a viewer. The active shutter glasses include a right lens and a left lens through which an image projected from the electronic display may be viewed. The active shutter glasses also include a right lens parallax barrier and a left lens parallax barrier corresponding to the right lens and the left lens, respectively. A controller is configured to control the parallax barriers. The controller controls the parallax barriers to block viewing of either a right lens image area or a left lens image area if a color difference between corresponding pixels of the right and left lens image areas is greater than or equal to a predefined difference threshold. The controller controls the parallax barriers to permit viewing of the projected image through the right lens image area and the left lens image area simultaneously if the color difference between the corresponding pixels is less than the predefined threshold.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIGS. 4A-4B illustrate example right lens image areas and left lens image areas of the active shutter glasses.

DETAILED DESCRIPTION

Methods and apparatus are disclosed for controlling portions of a parallax barrier in a 3D display system based on the relative color differences between corresponding right eye and left eye image areas of a stereoscopic image. Although autostereoscopic display and active shutter glasses embodiments are disclosed below, these are embodiments are exemplary, and should not be construed as limiting.

Figure 1:
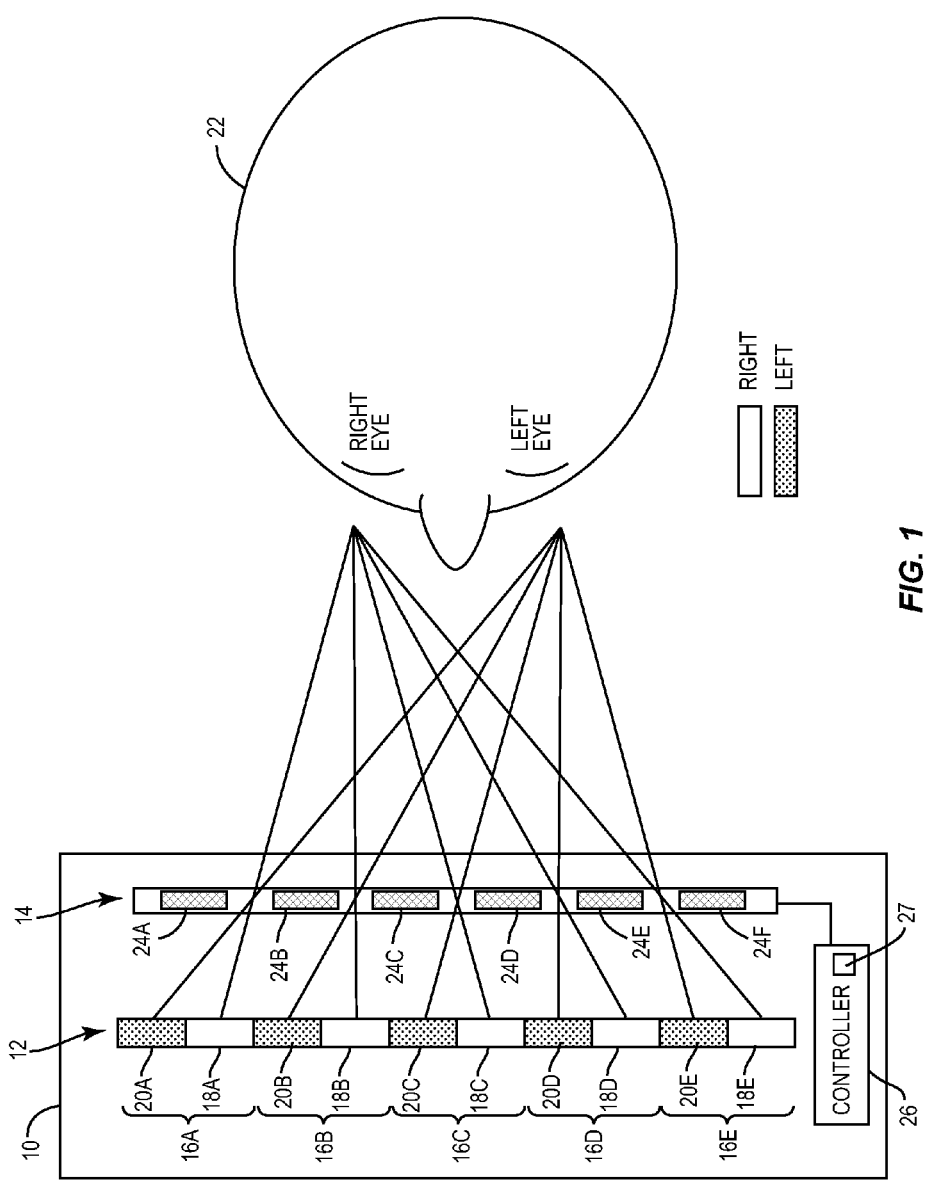
FIG. 1 illustrates an example autostereoscopic display.

Referring now to the drawings, FIG. 1 schematically illustrates an example autostereoscopic display 10 including a display layer 12 and a parallax barrier 14. The display 10 may correspond to a television, or portable gaming device, for example. An interleaved image is projected on the display layer 12, with the image comprising a plurality of adjacent sets 16A-E of right eye image areas 18 and left eye image areas 20. The right eye image areas 18 and left eye image areas 20 are interleaved through their arrangement into set 16. The parallax barrier 14 is situated between the display layer 12 and a viewer 22. The parallax barrier 14 includes a plurality of separate parallax barrier areas 24A-F each corresponding to one of the adjacent sets 16 of right and left image areas 18, 20. Although five sets 16 of image areas are shown in FIG. 1, it is understood that this is only a non-limiting example, and that other quantities of sets of image areas could be used.

A controller 26 is configured to control each of the parallax barrier areas 24. The controller 26 may include hardware, software, or any combination thereof. In one example, the controller 26 includes one or more microprocessors. If a color difference between pixels of a right eye image 18 area and corresponding pixels of a left eye image 20 area are greater than or equal to a predefined difference threshold, the controller 26 controls a corresponding each parallax barrier area 24 to block either its corresponding right or left eye image area from the viewer 22. Otherwise, if the color difference is less than the predefined threshold, the controller 26 controls the parallax barrier area 14 to display both of its corresponding right and left eye image areas to the viewer.

Take set 16A of image areas 18A, 20A as an example. A color difference is determined between pixels of image area 18A and corresponding pixels of image area 20A. If the color difference is greater than or equal to the predefined difference threshold, then corresponding parallax barrier area 24A is turned ON to block the viewer's right eye from viewing image area 20A, such that within set 16A, the right eye only sees image area 18A, and the left eye only sees image area 20A. However, if the color difference is less than the predefined threshold (i.e., indicating that there is little or no difference between the image areas 18A, 20A), then the parallax barrier area 24A is turned partially or completely OFF so that image area 20A is visible to both the right and left eyes of the viewer 22.

As another example, refer to set 16B of image areas. When turned ON, the parallax barrier area 24B associated with this set 16B performs the following functions: (1) blocking the viewer's right eye from viewing image area 20B, and (2) blocking the viewer's left eye from viewing image area 18A (of set 16A). If a color difference between image areas 18B, 20B of set 16B is below the difference threshold, then parallax barrier area 24B will be turned OFF so that blocking (1) above is not performed. However, as an unintended consequence blocking (2) also will not be performed, causing the viewer's left eye to see neighboring image areas 18A, 20A. If image areas 18A, 20A are determined to have 3D information (i.e. their color difference exceeds the difference threshold), it may be unpleasant for the viewer to areas 18A, 20A with the left eye. To address this problem, the color difference of neighboring sets 16 of image areas 18, 20 may be analyzed, so that parallax barrier 24B is only turned OFF if it parallax barrier 24A is also able to be turned OFF (i.e. the color difference between image areas 18A, 20A is beneath the difference threshold).

The controller 26 is also configured to compare color scale values of corresponding pixels of the sets of right and left image areas to determine a color difference between the corresponding pixels, and may store the color differences in a difference map in memory 27. Thus, to determine if the difference color between right and left eye image areas 18A, 20A is greater than or equal to the threshold, a difference map for the set 16 of image areas 18A, 20A may be reviewed. In one example, the difference map is predetermined, and the controller 26 only needs to retrieve the predetermined difference map from memory 27.

The difference map may be based, for example, on a 0-255 color scale. A stored color difference within the map represents corresponding (i.e. similarly located) displayed areas within each larger image area 18, 20. Depending on the granularity of the difference map, the displayed area represented by the color difference may represent a single pixel, or a group of pixels. In one example, different red, green, and blue (RGB) values of a pixel or group of pixels are separately compared, and a largest difference between the respective red, green and blue color values in the displayed area is stored in the difference map. In one example, the predefined threshold is "9" on the 0-255 color scale. Of course, this is only an example threshold, and it is understood that other thresholds could be used.

A brightness of a set of right and left image areas may be reduced responsive to the color difference between corresponding pixels of the right and left image areas being less than the predefined threshold. Thus, to use the example of set 16A from above, with parallax barrier area 14 turned partially or completely OFF, in order to prevent image area 20A from appearing too bright, the brightness of one or both of the image areas 18A, 20A may be adjusted to achieve a desired brightness. This may include operating each of the image areas 18A, 20A at 50% brightness, for example. Of course other adjustments would be possible, such as increasing the brightness of other image areas 18, 20 whose corresponding parallax barrier area 24 is turned ON (e.g., neighboring image areas that have a corresponding color difference that is greater than or equal to the predefined threshold). Thus, using this technique, brightness of a 3D display may be reduced, which can result in better performance in both lumens per watt and also brightness.

In one example, the parallax barrier 14 comprises a liquid crystal display (LCD), which optionally may be a monochrome LCD. In this example, controlling the parallax barrier includes adjusting a voltage applied to an appropriate one of the parallax barrier areas 24A-F to permit a desired amount of light to pass through the parallax barrier area 24A-F.

Figure 2:
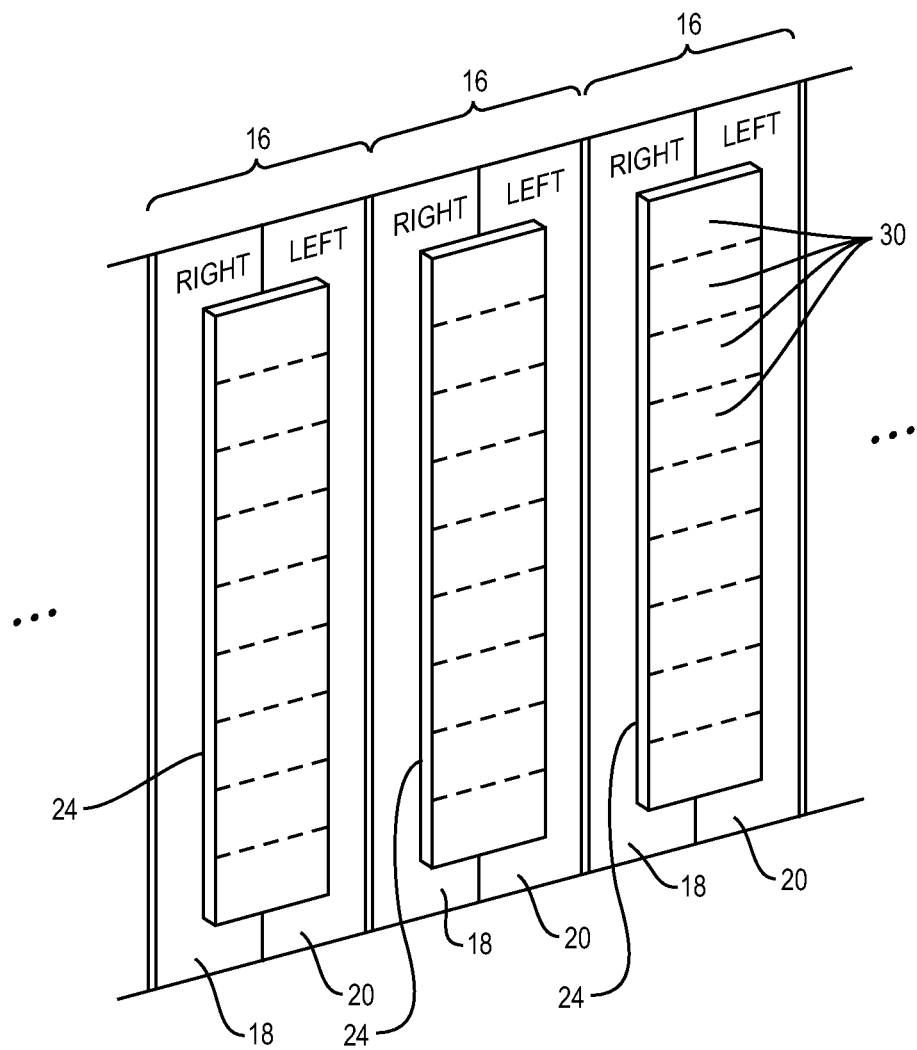
FIG. 2 illustrates another view of the example autostereoscopic display.

FIG. 2 schematically illustrates another view of the example autostereoscopic display 10. As shown in FIG. 2, the image areas 18, 20 and their corresponding parallax barrier areas 24 may extend vertically as columns within the display 10. Each parallax barrier area 24 may be controlled as a single unit, such that if there is any color difference meeting or exceeding the difference threshold within a set 16 of image areas 18, 20, the entire parallax barrier area 24 corresponding to the set 16 is turned ON. Alternatively, each parallax barrier area 24 may include separately controllable areas 30, so that portions of a given parallax barrier area 24 may be differently controlled. This would enable a portion of an image area 18, 20 to be viewable only by a right or left eye, but other portions of the image area could be viewed by both eyes. Of course, although the image areas 18, 20 and parallax barrier areas 24 are shown as vertical bars, it is understood that this is only an example, and that diagonal or horizontal bars could instead be used, depending on a viewer's orientation with respect to the electronic display 10.

Figure 3A:
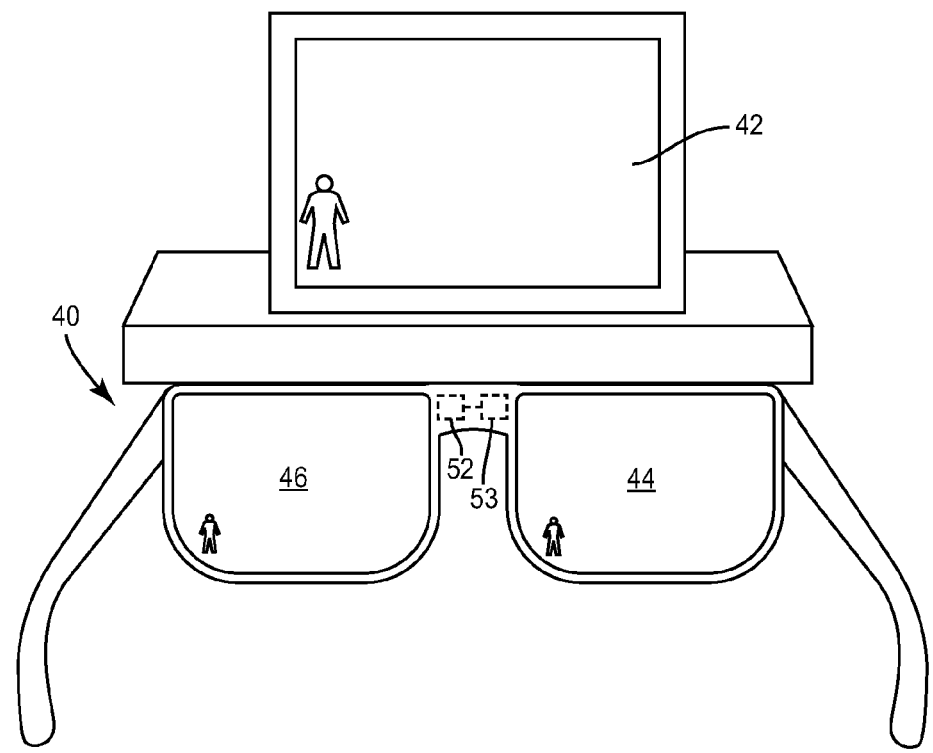
FIGS. 3A-B illustrates views of exemplary active shutter glasses.
Figure 3B:
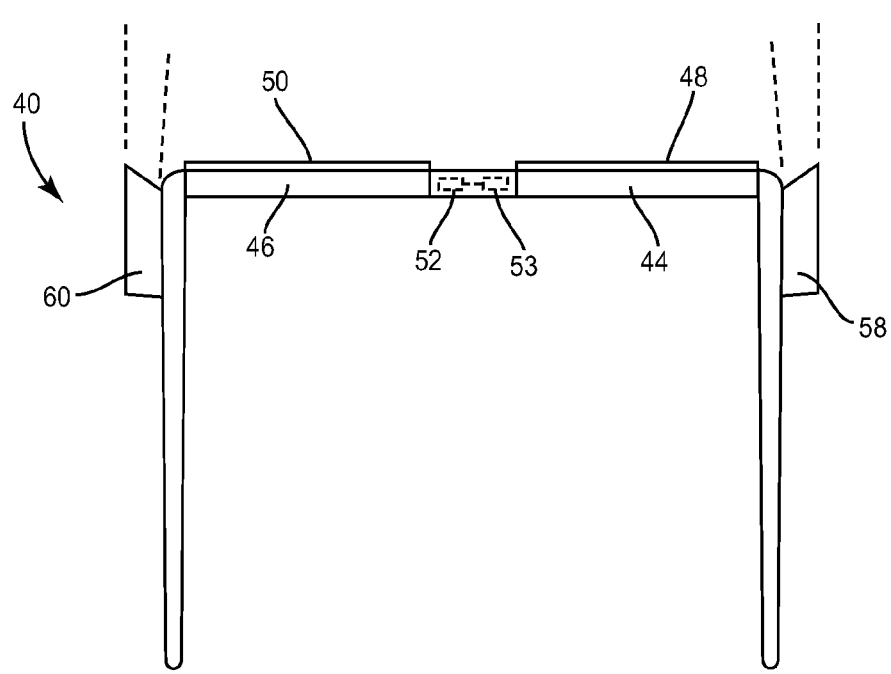

FIGS. 3A-3B illustrate active shutter glasses 40 that may be used to achieve a similar effect as the autostereoscopic display 10 described above. The active shutter glasses 40 are synchronized with an electronic display 42 (e.g., a viewing area of a television) to provide a three-dimensional view of the electronic display 42 to a viewer. A controller 52 communicates with the display 42 to provide the synchronization (e.g., over a wireless connection). The controller 52 may include hardware, software, or any combination thereof. In one example, the controller 52 includes one or more microprocessors.

The glasses include a right lens 44 and a left lens 46 through which an image projected from the electronic display 42 may be viewed. The glasses 40 also include a right lens parallax barrier 48 corresponding to the right lens 44, and a left lens parallax barrier 50 corresponding to the left lens 46. The parallax barriers 48, 50 may be located in front of, behind or within their corresponding lens 44, 46.

The controller 52 is configured to control the parallax barriers 48, 50 to block viewing of either a right lens image area or a left lens image area (i.e. a portion of either a right lens image or a left lens image) if a color difference between corresponding pixels of the right and left lens image areas is greater than or equal to a predefined difference threshold. The controller 52 is also configured to control the parallax barriers to permit viewing of the projected image through the right lens image area and the left lens image area simultaneously if the color difference between the corresponding pixels is less than the predefined threshold.

Referring to FIGS. 4A-B, a plurality of right lens image areas 54A-F and corresponding left lens image areas 56A-F are illustrated. Each image area 54, 56 has a corresponding parallax barrier portion 48, 50 that is controlled to permit or restrict viewing through its associated image area. Thus, if a color difference between lens image areas 54A and 56A is greater than or equal to the threshold, then the parallax barrier portions 48A, 50A operate as usual, so that only one of the lens image areas 54A, 56A is visible at any given time.

However, if the color difference between the lens image areas 54A, 56A is less than the difference threshold (i.e., indicating that there is little or no difference between the image areas 54A, 56A), then the corresponding parallax barrier portions 48A, 50A may be operated to display both of the areas 54A, 56A simultaneously. In one example, each area is shown but only with partial transparency (e.g. 50% transparency for each area 54A, 56A). In another example, the areas 54A, 56A are shown at or near full brightness, but the controller 52 communicates with the display 42 to reduce the brightness of other image areas to conserve power.

The glasses 40 include a right camera lens 58 operative to record the projected image of the display 42 from the perspective of the right lens 44, and a left camera lens 60 operative to record the projected image of the display 42 from the perspective of the left lens 46 (see FIG. 3B). In one example, the controller 52 is configured to determine if a color difference between corresponding pixels of the right and left lens image areas 54, 56 is greater than or equal to a predefined difference threshold by comparing images recorded by the right and left camera lenses 58, 60.

The controller 52 may the determined color differences in a difference map in memory 53. The recorded right and left images may also be stored, even if temporarily, in the memory 53. The controller 52 may create the difference map in the same fashion as the controller 26. Thus, the difference map may be based on a 0-255 color scale, may store values for pixels or groups of pixels, may separately analyze RGB pixel values, etc.

Figure 5:
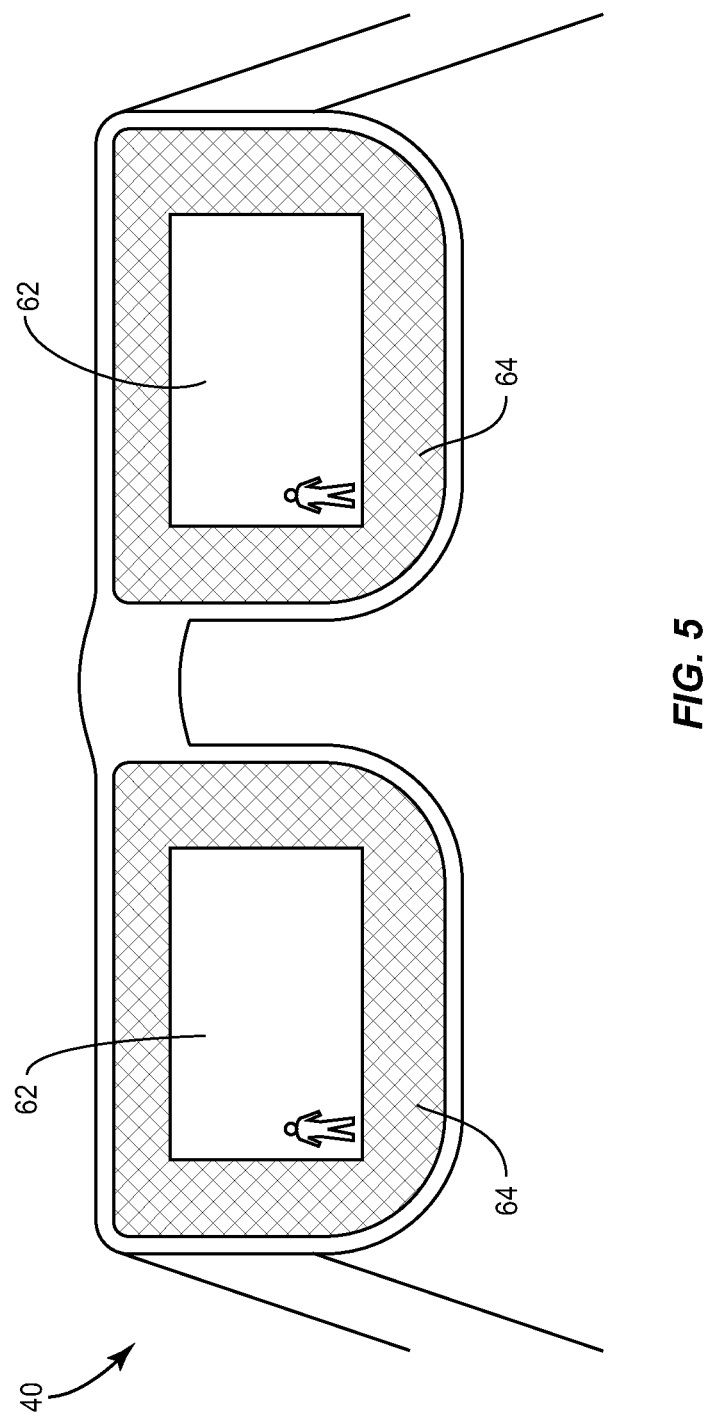
FIG. 5 illustrates an exemplary blocking feature of the active shutter glasses.
Figure 6:
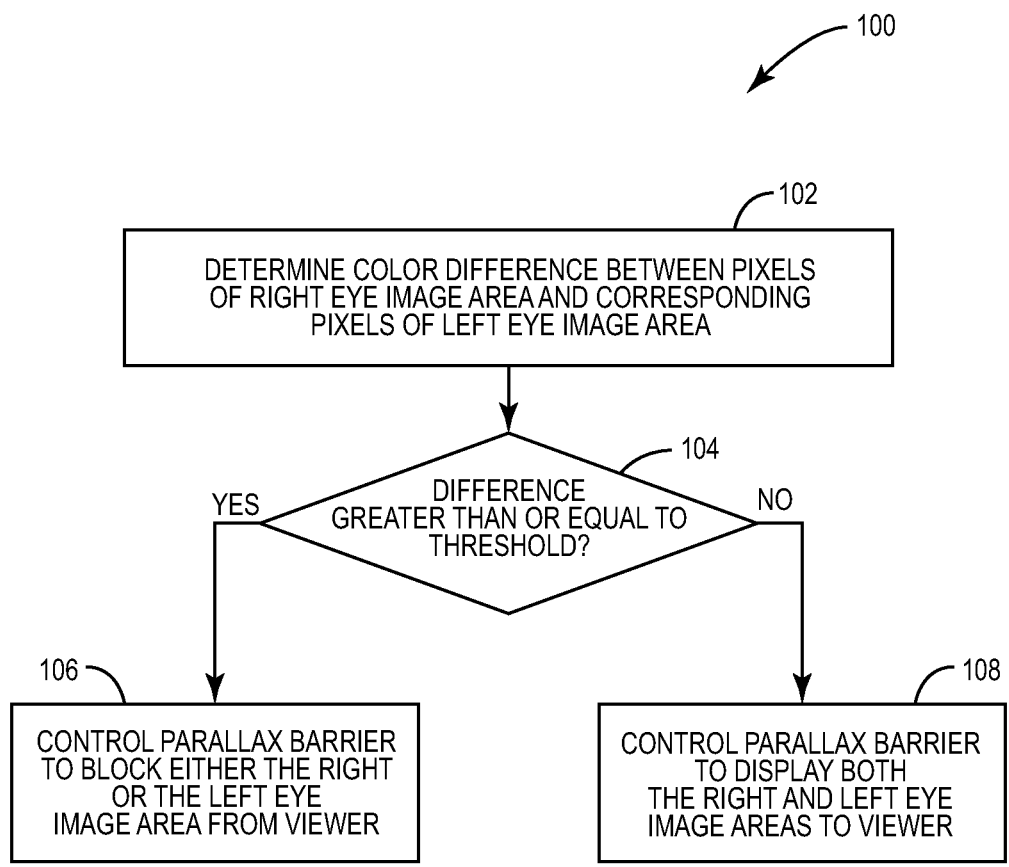
FIG. 6 schematically illustrates an example method of providing a three-dimensional display to a viewer.

The controller 52 may optionally be further configured to control the right and left lens parallax barriers 48, 50 to at least partially block right and left lens image areas that are not used to view the image projected from the electronic display 42 based on a timer, a user preference, or both. Referring to FIG. 5, an image 62 corresponding to the display 42 and also an image 64 corresponding to an area outside of the display 42 (see cross-hatched area) may be viewable through the right and left lenses. Based on a stored user preference, or a timer indicating passing of a predefined time period, the parallax barriers 48, 50 may be controlled to partially or fully block the area 64 from viewing in either lens. Such blocking may be used to provide a more immersive 3D viewing experience. Use of the timer, however, may be beneficial, as a user may want to see outside of the display 42 when they are setting up a video viewing event (e.g., a user may want to see and/or view a keyboard or remote control).

The controller 52 may also be configured to wirelessly transmit a notification to the electronic display 42 indicating which right lens image areas 54 and corresponding left lens image areas 56 a viewer is being permitted to view through the right lens 44 and the left lens 46 simultaneously. A wireless transceiver for performing such transmissions may be located within the controller 52, for example.

FIG. 4 schematically illustrates an example method 100 of providing a three-dimensional display to a viewer. A color difference is determined between pixels of a right eye image area and corresponding pixels of a left eye image area (step 102), and the determined difference is compared to a predefined difference threshold (step 104). If a color difference between pixels of the right eye image area and corresponding pixels of the left eye image area is greater than or equal to a predefined difference threshold, a parallax barrier is controlled to block either the right or the left eye image area from the viewer (step 106). Otherwise, if the color difference is less than the predefined threshold, the parallax barrier is controlled to display both the right and left eye image areas to the viewer (step 108).

The foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A method of providing a three-dimensional display to a viewer, comprising:
    determining a color difference between pixels of a right eye image area an corresponding pixels of a left eye image area, wherein the right eye image area and the left eye image area make up a first set of a plurality of sets that make up a display layer, the first set corresponds to a parallax barrier, and wherein determining the color difference comprises:
    comparing a color scale value of each pixel in a plurality of pixels of the right eye image area to a color scale value of a corresponding pixel in a plurality of pixels of the left eye image area; and
    storing the color difference between the compared color scale values in a difference map;
    determining a second color difference between pixels of a second right eye image area and corresponding pixels of a second left eye image area, wherein the second right eye image area and the second left eye image area make up a second set of the plurality of sets, the second set corresponds to a second parallax barrier controlled independently of the parallax barrier, and is adjacent to the first set;

comparing the color difference and the second color difference to a predefined difference threshold;

controlling the parallax barrier to block either the right or the left eye image area from the viewer responsive to determining that the color difference is greater than or equal to the predefined difference threshold;

controlling the parallax barrier to display both the right and left eye image areas to the viewer responsive to determining that the color difference and the second color difference are less than the predefined difference threshold; and conserving power resources responsive to determining that the color difference is less than the predefined difference threshold, wherein conserving the power resources comprises reducing a brightness of the right and left eye image areas.

2. The method of claim 1, further comprising:
if the color difference is less than the predefined threshold, increasing a brightness of one or more neighboring image areas that have a corresponding color difference that is greater than or equal to the predefined threshold.

3. The method of claim 1:
wherein the parallax barrier comprises a liquid crystal display (LCD) situated between a display layer of an autostereoscopic electronic display and the viewer; and
wherein controlling the parallax barrier comprises adjusting a voltage applied to the parallax barrier to permit a desired amount of light to pass through the parallax barrier.

4. The method of claim 1, wherein the parallax barrier comprises a right lens barrier corresponding to a right lens of a pair of active shutter glasses, and a left lens barrier corresponding to a left lens of the active shutter glasses, the method further comprising:
recording a right lens image corresponding to the right lens, and a left lens image corresponding to the left lens, the right lens image including a plurality of right eye image areas, and the left lens image including a plurality of corresponding left eye image areas; and
determining color differences between pixels of the right lens image areas and their corresponding pixels in the left lens image areas.

5. The method of claim 4, wherein controlling the parallax barrier to display both the right and left eye image areas to the viewer comprises:
permitting the viewer to view an image projected from an electronic display through the right lens image area and the left lens image area simultaneously.

6. The method of claim 4, wherein controlling the parallax barrier to block either the right or the left eye image area from the viewer comprises:
controlling the right lens barrier and the left lens barrier to block portions of the right and left lens images that are outside of the image projected from the electronic display based on a timer, a user preference, or both.

7. The method of claim 4, further comprising:
wirelessly transmitting a notification to the electronic display indicating which right lens image areas and corresponding left lens image areas the viewer is being permitted to view through the right lens and the left lens simultaneously.

8. An autostereoscopic electronic display, comprising:
a display layer upon which an image is projected, the image comprising a plurality of adjacent sets of right and left eye image areas;

a parallax barrier situated between the display layer and a viewer, the parallax barrier comprising a plurality of separate parallax barrier areas each corresponding to one of the adjacent sets of right and left eye image areas; and a processing circuit configured to:
determine a color difference between pixels of a right eye image area and corresponding pixels of a left eye image area of an individual set of the plurality of adjacent sets, wherein to determine the color difference, the processing circuit:
compares a color scale value of each pixel in a plurality of pixels of the right eye image area to a color scale value of a corresponding pixel in a plurality of pixels of the left eye image area; and
stores the color differences in a difference map;
determine a second color difference between pixels of a second right eye image area and corresponding pixels of a second left eye image area, wherein the second right eye image area and the second left eye image area make up a
second set of the plurality of sets, the second set corresponds to a second parallax barrier controlled independently of the parallax barrier, and is adjacent to the individual set;
compare the color difference and the second color difference to a predefined difference threshold;
control each parallax barrier area to block either its corresponding right or left eye image area from the viewer responsive to determining that the color difference between pixels of the right eye image area and corresponding pixels of the left eye image area is greater than or equal to a predefined difference threshold;
control each parallax barrier area to display both of its corresponding right and left eye image areas to the viewer responsive to determining that the color difference and the second color difference are less than the predefined difference threshold; and
conserve power resources responsive to determining that the color difference is less than the predefined difference threshold, wherein to conserve the power resources the processing circuit is configured to reduce a brightness of the right and left eye image areas.

9. The autostereoscopic electronic display of claim 8, wherein the processing circuit is further configured to:
if the color difference is less than the predefined threshold, increase a brightness of one or more neighboring image areas that have a corresponding color difference that is greater than or equal to the predefined threshold.

10. The autostereoscopic electronic display of claim 8:
wherein the parallax barrier comprises a liquid crystal display (LCD); and
wherein controlling the parallax barrier comprises adjusting a voltage applied to an appropriate one of the parallax barrier areas to permit a desired amount of light to pass through the parallax barrier area.

11. Active shutter glasses that are synchronized with an electronic display to provide a three-dimensional view of the electronic display to a viewer, the active shutter glasses comprising:
a right lens and a left lens through which an image projected from the electronic display may be viewed;
a right lens parallax barrier and a left lens parallax barrier corresponding to the right lens and the left lens, respectively; and
a processing circuit configured to:

determine a color difference between pixels of a right eye image area of a plurality of right eye image areas and corresponding pixels of a left eye image area of a plurality of left eye image areas, wherein to determine the color difference the processing circuit:

compares a color scale value of each pixel in a plurality of pixels of the right eye image area to a color scale value of a corresponding pixel in a plurality of pixels of the left eye image area, wherein different red, green, and blue values of each pixel are separately compared; and stores a largest difference between the respective red, green, and blue color values color differences in a difference map;

determining a second color difference between pixels of a second right eye image area and corresponding pixels of a second left eye image area, wherein the second right eye image area and the second left eye image area make up a second set of the plurality of sets, the second set corresponds to a second parallax barrier controlled independently of the parallax barrier, and is adjacent to the first set;

compare the largest color difference to a predefined difference threshold;

control the parallax barriers to block viewing of either a right lens image area or a left lens image area responsive to determining that the color difference is greater than or equal to a predefined difference threshold;

control the parallax barriers to permit viewing of the projected image through the right lens image area and the left lens image area simultaneously responsive to determining that the color difference is less than the predefined difference threshold; and conserve power resources responsive to determining that the largest color difference is less than the predefined difference threshold, wherein to conserve the power resources the processing circuit is configured to reduce a brightness of the right and left eye image areas.

12. The active shutter glasses of claim 11, further comprising:
a right camera lens operative to record the projected image from the perspective of the right lens; and
a left camera lens operative to record the projected image from the perspective of the left lens.

13. The active shutter glasses of claim 11, wherein the processing circuit is further configured to:
control the right and left lens barriers to at least partially block from viewing right and left lens image areas that are not used to view the image projected from the electronic display.

14. The active shutter glasses of claim 11, wherein the processing circuit is further configured to:
wirelessly transmit a notification to the electronic display indicating which right lens image areas and corresponding left lens image areas the viewer is being permitted to view through the right lens and the left lens simultaneously.

15. The method of claim 1 wherein conserving the power resources comprises reducing the brightness of one or more neighboring image areas having a corresponding color difference that is less than the predefined threshold.

* * * * *